United States Patent
Angerami et al.

(10) Patent No.: US 6,467,728 B2
(45) Date of Patent: Oct. 22, 2002

(54) AIRCRAFT PASSENGER CABIN WITH A STAND FOR TRANSPORTING A PASSENGER IN AN UPRIGHT POSITION

(75) Inventors: Jade Gaeta Angerami, Bauru-Sao Paulo (BR); Andreas Baatz, Sauensiek (DE); Stefan Hiesener, Buxtehude (DE); Harald Merensky, Hamburg (DE)

(73) Assignees: Airbus Deutschland GmbH, Hamburg (DE); Deutsche Lufthansa AG, Cologne (DE)

(*) Notice: Subject to any disclaimer, the term of this patent is extended or adjusted under 35 U.S.C. 154(b) by 0 days.

(21) Appl. No.: 09/792,621

(22) Filed: Feb. 23, 2001

(65) Prior Publication Data

US 2002/0000490 A1 Jan. 3, 2002

(30) Foreign Application Priority Data

Feb. 23, 2000 (DE) .......................... 100 08 259

(51) Int. Cl.$^7$ .............................................. B64D 11/06
(52) U.S. Cl. ............................... 244/118.5; 244/122 R; 244/118.6
(58) Field of Search ........................... 244/118.6, 118.5, 244/122 R; 105/329.1, 344, 345; 296/64; 104/57, 53

(56) References Cited

U.S. PATENT DOCUMENTS

| | | | | |
|---|---|---|---|---|
| 2,373,185 A | * | 4/1945 | Hurley | 89/37.17 |
| 2,685,331 A | * | 8/1954 | Gauntlett et al. | 297/473 |
| RE26,475 E | * | 10/1968 | Cohen | 244/162 |
| 4,700,632 A | * | 10/1987 | Schmutz | 104/63 |
| 4,795,113 A | * | 1/1989 | Minovitch | 104/138.1 |
| 4,993,666 A | * | 2/1991 | Baymak et al. | 244/122 R |
| 5,611,503 A | | 3/1997 | Brauer | |
| 5,829,836 A | | 11/1998 | Schumacher et al. | |
| 6,273,366 B1 | * | 8/2001 | Sprenger et al. | 244/118.5 |

FOREIGN PATENT DOCUMENTS

| DE | 19534024 | 3/1997 |
|---|---|---|
| DE | 19814548 | 7/1999 |

* cited by examiner

Primary Examiner—Robert P. Swiatek
Assistant Examiner—Timothy D Collins
(74) Attorney, Agent, or Firm—W. F. Fasse; W. G. Fasse

(57) ABSTRACT

Passengers are transported in a cabin of a passenger aircraft in an upright position. For this purpose the aircraft cabin is equipped with passenger stands. Each stand has a passenger backing and a safety belt, preferably a three-point safety belt. The stands are positioned in a standing room area of the cabin which has a sufficient vertical clearance between floor and ceiling for accommodating passengers in the upright position. The passenger backing has preferably a shell-shape forming a back support as a lean-against portion and at least one side portion for privacy. The shell or flat backing wall may itself be connected either directly or through a post for an angular adjustment relative to the forward flight direction.

21 Claims, 4 Drawing Sheets

AIRCRAFT PASSENGER CABIN WITH A STAND FOR TRANSPORTING A PASSENGER IN AN UPRIGHT POSITION

PRIORITY CLAIM

This application is based on and claims the priority under 35 U.S.C. §119 of German Patent Application 100 08 259.9, filed on Feb. 23, 2000, the entire disclosure of which is incorporated herein by reference.

FIELD OF THE INVENTION

The invention relates to an aircraft passenger cabin structure equipped with facilities for optimizing the number of passengers that can be transported on a given cabin floor space in commercial passenger aircraft.

BACKGROUND INFORMATION

Conventionally, passengers must sit on special passenger seats in commercial passenger aircraft. At least during the starting and landing phase of an aircraft, passengers must be seated and tied down by safety belts in order to assure a sufficient safety in case of a crash or a rough landing. Even during cruising flight it is desirable that passengers remain in their seats due to the limited space available in aircraft aisles and service facilities such as toilets. Furthermore, when an aircraft during flight must pass through a turbulent weather condition, passengers are more quickly secured in their seats if they are already sitting in their seats. Thus, it is essential for the comfort of a passenger that the aircraft seats within the cabin are secured to the cabin floor with a sufficient spacing from one row of seats to the next and that each seat provides a comfortable seat width in the direction perpendicularly to the flight direction.

However, requiring that all passengers should be seated at all times does not result in a most efficient space utilization within the aircraft cabin. Thus, it is the aim of airlines to maximize the number of passengers relative to an available cabin floor space in order to minimize the transport costs per passenger. The requirement of an optimal comfort and safety for the passengers is not necessarily compatible with a second requirement of maximizing the number of passengers per available cabin floor space to minimize costs. Thus, a compromise solution is required. Such a compromise leads to optimally utilizing the available cabin floor space for each passenger in such a way that the space allocated for each passenger is sufficient while selling that space or seat for a justifiable price is possible. U.S. Pat. No. 5,611,503 discloses an example of an involved calculating method for developing seating configurations or cabin layouts in the passenger cabin of a commercial aircraft, whereby the calculations aim at optimizing the comfort under varying conditions such as changing occupancy rates while simultaneously maximizing the number of passenger seats per available floor space. That seating row and column configuration which provides the highest passenger comfort is then installed in the passenger cabin.

German Patent Publication DE 195 34 024 C2 discloses a seating group or row of seats for a passenger cabin of an aircraft. The width of the individual seats can be widened when a passenger takes up a seat. When the seats are not used the seats can be narrowed, thereby to at least temporarily provide for a wider aisle and to provide more comfort for passengers who occupy a widened seat next to a narrowed seat which is not occupied. Please see also U.S. Pat. No. 5,829,836 (Schumacher et al.) corresponding to the above German Patent DE 195 34 024 C2.

Conventional seating arrangements in passenger cabins of aircraft are all based on passenger sizes which require a minimal seat width in the direction perpendicularly to a longitudinal aircraft axis or flight direction and which require a minimal spacing between rows of seats in the direction of the longitudinal aircraft axis. These requirements permit calculating the maximum number of passenger seats for any given floor space in a passenger cabin. Only in those instances where not all seats have been sold for a particular flight, is it possible to widen the individual passenger seats for at least some passengers to thereby increase their comfort.

German Patent Publication DE 198 14 548 discloses an effort to reduce the space provided per passenger in passenger ground transportation vehicles such as buses, railroad cars or ferries. Seating supports are mounted in a frame structure, whereby the seat dimension in the facing direction of a user is relatively short. The backrest is an elastic flat component also secured to the frame structure. The backrest thus forms an elastic impact protection for a passenger seated in a row of seats behind a given row of seats. Such an arrangement is legally not permitted in an aircraft due to governmental safety regulations which are so strict that passengers in an aircraft, as opposed to passengers in ground transportation vehicles, must be seated in special aircraft seats capable of taking up defined accelerations in the horizontal and vertical directions. Moreover, aircraft seating arrangements must be capable of absorbing energy in case of a crash. Under conventional transport conditions it is not possible to transport aircraft passengers in a standing room fashion which has, for example, been possible for a long time in buses, rail vehicles and ferries.

OBJECTS OF THE INVENTION

In view of the foregoing it is the aim of the invention to provide the following objects singly or in combination:

to minimize the space required for transporting a passenger in an aircraft cabin to thereby maximize the number of passengers for any given cabin floor space;

an optimal comfort shall be provided in combination with a maximum floor space utilization in an aircraft cabin while still providing a sufficient mobility for the aircraft passengers;

to satisfy the legal safety regulations for aircraft passengers in case of a crash and during turbulent flights;

to facilitate the boarding and deplaning of a passenger aircraft;

to provide passenger stands in a standing room area of a passenger aircraft whereby such stands shall be adaptable to passengers of different sizes; and to make passenger seat tickets less expensive, particularly if two tickets are time shared tickets with a passenger stand and a passenger seat so that one of two persons can use the seat while the other person uses the stand and vice versa.

SUMMARY OF THE INVENTION

A passenger aircraft according to the invention comprises a cabin structure which is equipped with a standing room area having a clearance between floor and ceiling sufficient for passenger stands installed in the standing room area for transporting passengers in a standing position during starting, during flight, and during landing of the aircraft in the gravity field of the earth. Each passenger stand is equipped with at least one passenger backing for taking up accelerations to which a passenger may be exposed, including horizontal and/or vertical accelerations. Each stand is further equipped with a safety device, more specifically a safety belt, preferably a so-called three-point safety belt system.

A passenger standing in a passenger aircraft is exposed to a gravity gradient of the earths gravity that extends substantially in the direction from head to toe of the passenger. The term "substantially" is intended to take into account the attitude angle of the aircraft during starting and landing.

The invention provides a completely new transport concept for the floor space utilization in aircraft passenger cabins by using passenger stands in a standing room area of passenger aircraft, whereby the space requirements per passenger can be minimized and accordingly, the total number of passengers that can be transported is maximized. Each passenger stand is provided with a passenger backing mounted to at least one upright post and the backing or the stand is equipped with a safety device so that the required safety requirements are satisfied at all times including during starting and landing of an aircraft and during turbulent flights, even if the passengers are secured in an upright position. The safety device and the backing combine to hold the standing passenger in place.

By combining seating arrangements with passenger stands on the available floor space of a passenger cabin, the cabin layout is flexibly adaptable to various requirements and an optimal space utilization within the cabin is achieved.

A plurality of passenger stands may be arranged in the standing room area of the cabin in rows and columns, whereby passengers do not have to come out of their seats for deplaning or can readily assume their stands to thereby speed up the boarding procedure.

By preferably arranging the passenger backing in the stand so that the passenger using the stand faces substantially opposite to the flight direction, the safety is increased because forces that occur during a crash or rough landing force the passenger against the backing with his back over a large surface area, whereby the risk of injury is reduced because the loads per body surface area unit of the passengers' body are reduced.

By providing two upright posts the passenger backing can be arranged between these upright posts and any safety belts may be secured either to the posts or to the backing, whereby the safety is even increased, compared to the safety provided by conventional seating arrangements. Further, by using one post for mounting the backing the angular position of the backing relative to the flight direction is easily adjusted. Such adjustment is also possible where two posts are used to which the backing is secured by adjustable brackets.

By providing the passenger stand with an auxiliary seat support, the passenger stands can be used for prolonged periods of time because a passenger may rest his or her legs while resting on an auxiliary seat secured to the backing or the post or posts.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
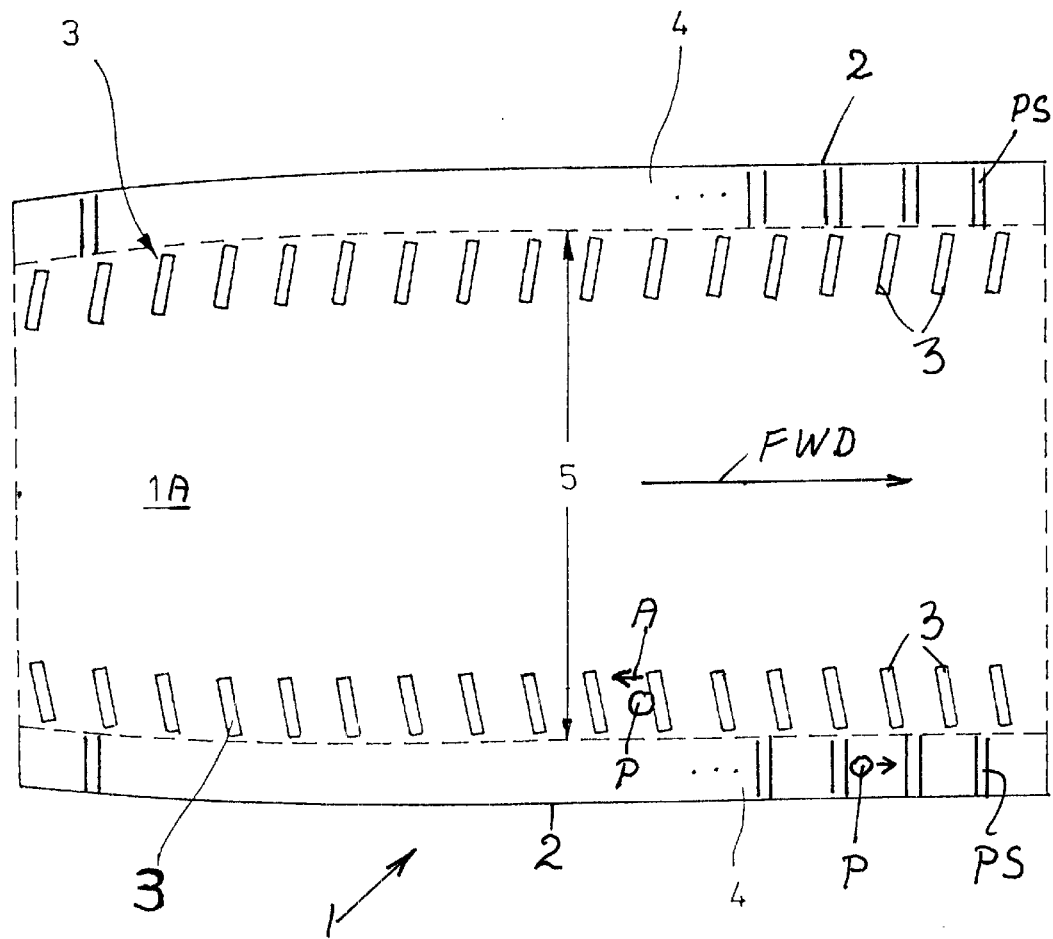
FIG. 1 is a plan view of a cabin floor space in a passenger aircraft showing a combination of passenger seats and passenger stands according to the invention.

FIG. 1 shows a plan view of one example layout according to the invention in a passenger aircraft cabin section 1 having a floor 1A and walls 2. The cabin layout has two areas. A first area 4 alongside the cabin walls 2 holds conventional passenger to be occupied by passengers P in an upright position. Only one column of stands 3 is shown along each seating row. However, several rows and columns of stands 3 may be arranged in different layouts.

Passengers P in the seats PS face in the forward or flight direction FWD. On the other hand, passengers P in the stands 3 face in the opposite direction as indicated by a respective arrow A. The stands 3 are preferably slightly slanted relative to the forward direction FWD as will be explained in more detail below with reference to FIG. 3. The required minimum spacing between the passenger seats PS in the forward or flight direction FWD is noticeably larger than the minimum spacing between the stands 3 in the same direction.

Figure 2:
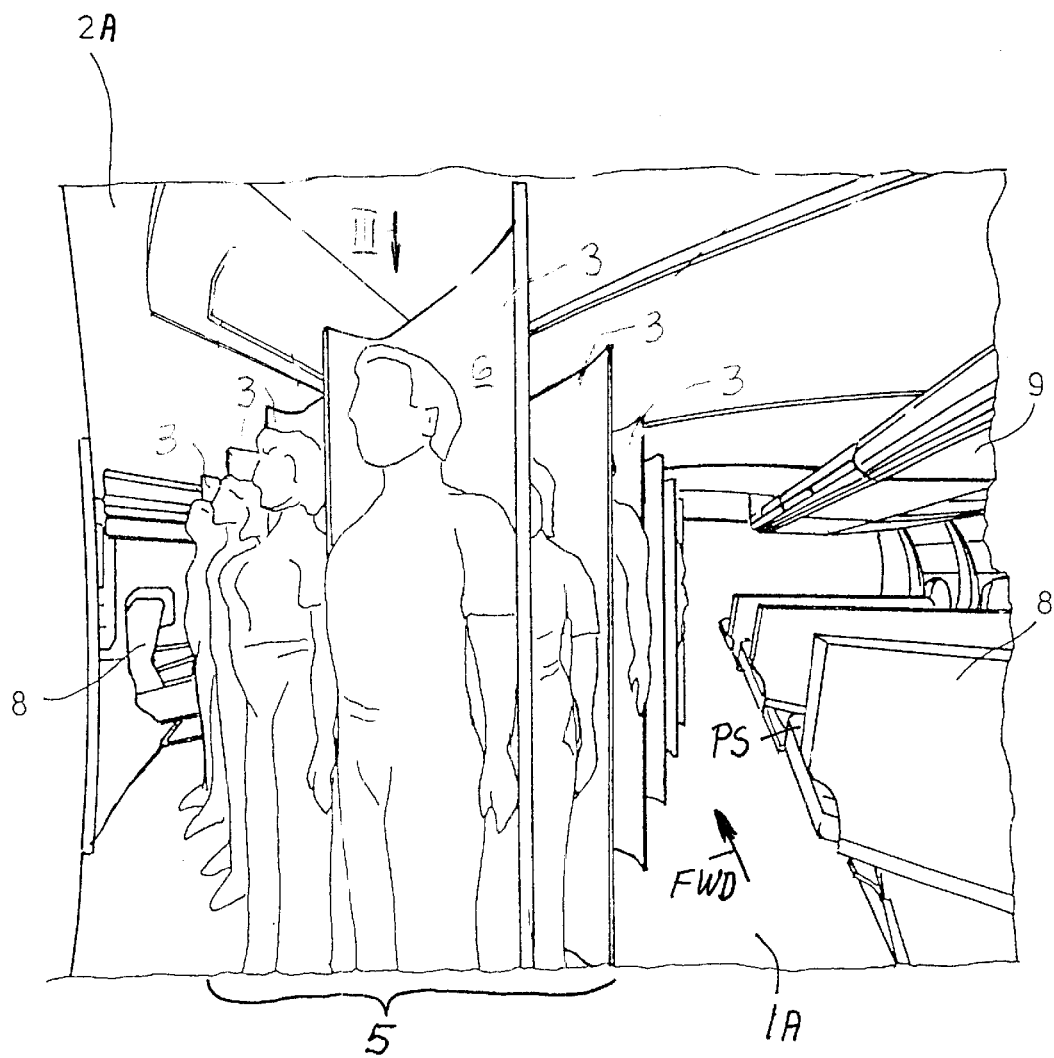
FIG. 2 is a perspective view into a cabin space in the flight direction illustrating passenger stands arranged in rows and columns.

FIG. 2 shows that the passenger seats PS are arranged in rows 8 below luggage compartments 9 where the clearance between the cabin floor 1A and the luggage compartments 9 is insufficient for a standing room. The standing room is provided between the rows 8 of seats PS where the clearance between the floor 1A and the ceiling 2A is sufficient for this purpose. As shown in FIG. 2 there are four stands 3 arranged in rows and the rows in turn are arranged in columns extending in the forward flight direction FWD. The arrangement is such that the passengers in the seats PS face in the forward direction while the passengers in the stands 3 face in the opposite direction. In FIG. 2 the individual stands 3 are constructed as shells 6 that are rigidly or adjustably secured to the floor 1A and to the ceiling 2A. Certain of the rows of stands 3 in the standing room area 5 may be replaced by rows 8 of seats PS so that rows of stands 3 and rows 8 of seats alternate with each other.

Referring further to FIG. 2 it may be necessary to avoid luggage compartments in the standing room area to provide the required clearance. However, each stand may be provided with its own luggage compartment.

As shown in FIG. 2, the stands 3 are constructed as shells 6 that provide the respective backing for each passenger individually at all times, but particularly during landing and starting as well as during turbulent flight. Each shell 6 defines the upright position of a passenger using the stand 3. The backing in the form of a shell 6 is preferred for privacy reasons. However, any construction of a support rest or support or backing wall can be used for the present purposes.

Additional safety devices such as belts are secured to the stands 3 as will be described in more detail below. Each stand may be further equipped with space for emergency equipment, such as a life vest, safety instructions, and a display for such instructions or the like as well as comfort equipment such as reading lamps, call buttons and the like. Displays are positioned in or on the forward facing side of a backing 3 so that the passenger in the next row can see it. The arrangement of the stand 3 in rows and columns as shown in FIG. 2 provides for an optimal utilization of the floor space 1A since each passenger stand 3 requires less space than a respective seat.

Figure 3:
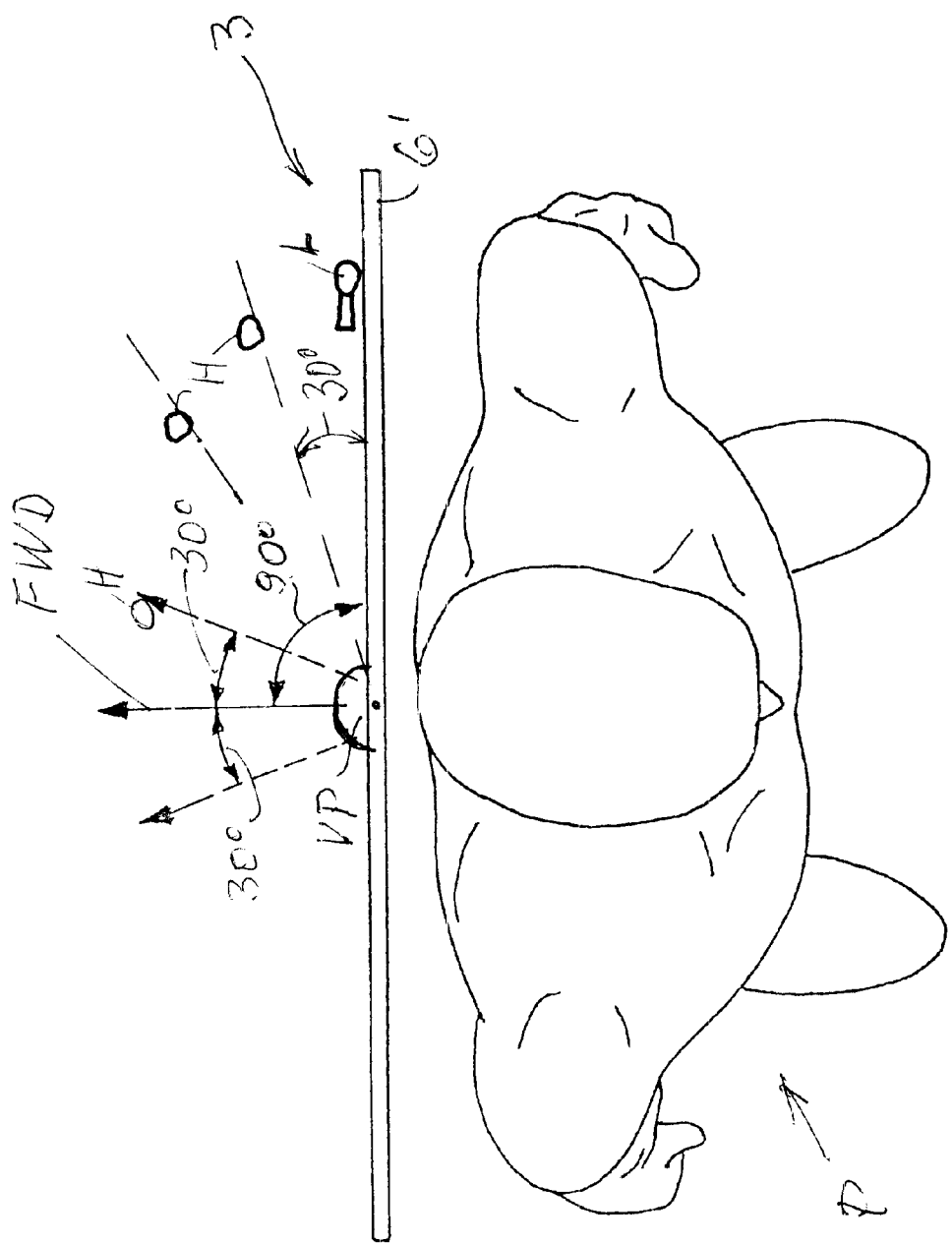
FIG. 3 is a schematic view in the direction of the arrow III in FIG. 2 illustrating several possible angular positions of the present passenger stand particularly its passenger backing relative to the flight direction.

FIG. 3 shows the arrangement of a stand 3 at 90° relative to the forward flight direction FWD, whereby the passenger P faces in the opposite direction. The passenger will be held against the backing 6' constructed in this example as a flat wall. Movement of the passenger in any other direction will be restrained by belts to be described with reference to FIGS. 4A, 4B and 4C. Securing the passenger to the backing 6' reduces the risk of injury to standing passengers against bumping into other cabin components.

The backing 6' can be locked to the floor by a lock L in any one of a plurality of angularly adjusted positions as shown in dashed lines. A minimum slant relative to the forward direction FWD should be at least 30°, preferably 60°. The lock L engages any one of a plurality of holes H in the floor if it is desired to slant the backing 6' relative to the forward direction FWD. For this purpose the backing 6' is secured to a vertical post VP. The adjustability of the angle of the backing 6' relative to the flight direction FWD can be achieved in several ways. For example, the vertical post VP may be secured in bearings in the cabin floor and in the ceiling. In this embodiment the backing 6' would be rigidly secured to the vertical post VP. In a modification the vertical post VP would be rigidly secured to the floor and ceiling while the backing 6' is rotatably secured to the vertical post. In both instances the lock L could be a locking bar, preferably a spring-biased locking bar, that can be lifted out of a locking hole H by a handle and pressed onto the hole by a spring-biasing force.

Figure 4A:
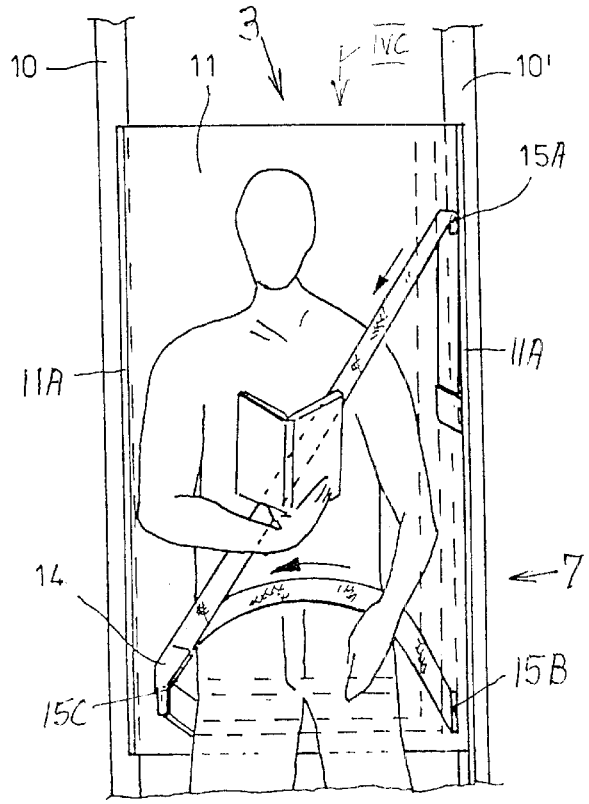
FIG. 4A is a front view of an embodiment of a passenger stand mounted on two upright posts.
Figure 4B:
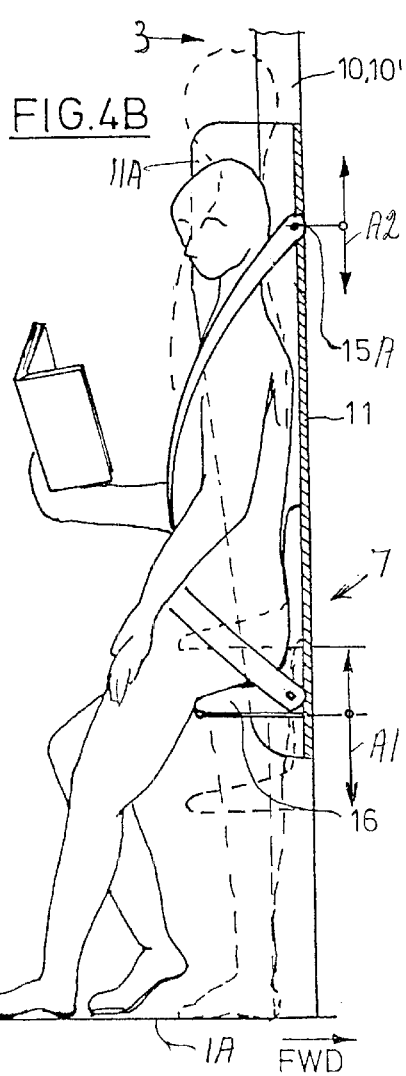
FIG. 4B is a side view of the present passenger stand equipped with an auxiliary seat shown in its use position.
Figure 4C:
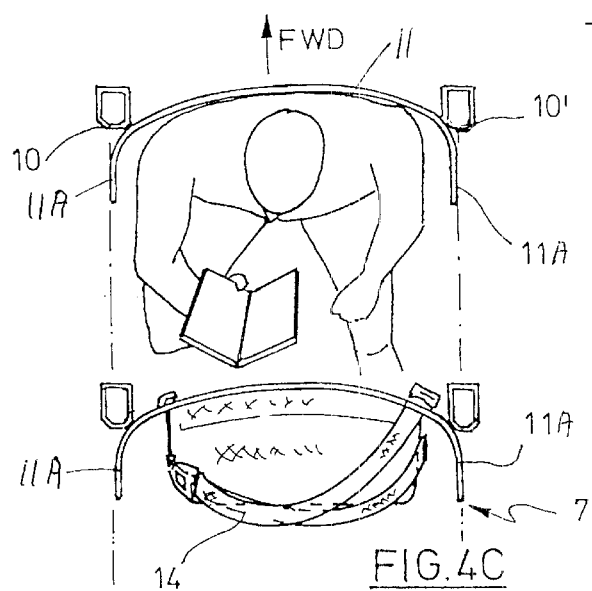
FIG. 4C is a view in the direction of the arrow IVC in FIG. 4A and showing two passenger stands arranged in a column.

Further example embodiments of the construction of the stand 3 are shown in FIGS. 4A to 4C, which show an embodiment in which each stand 3 has a backing shell 11 secured to two upright posts 10 and 10' to form a support structure 7. The shell 11 does not need to reach all the way to the floor 1A. Preferably, the shell 11 has a back portion against which the back of a passenger is held by a seatbelt system 14, preferably a three-point seatbelt system having connection points 15A, 15B and 15C secured to the shell 11 and/or the upright posts 10, 10' as shown in FIG. 4A.

FIG. 4B shows the shell 11 preferably provided with an auxiliary seat 16, which is preferably a folding seat permitting a passenger to rest his or her feet. The seat 16 is preferably adjustable along one or two guide rails as indicated by an arrow A1. A locking mechanism of conventional construction permits locking the seat in several positions at different elevations above the floor 1A to accommodate passengers of different sizes.

For the same reason the mounting point 15A of the seatbelt 14 is preferably adjustable in a guide slot up or down as indicated by an arrow A2.

The upright posts 10, 10' are rigidly secured to the floor 1A and to the ceiling 2A at a horizontal spacing from each other best seen in FIG. 4C. The horizontal spacing is sufficient for fully supporting the back of a passenger. FIG. 4C also shows the arrangement of two passenger stands 3 with their support structures in a column.

FIG. 4C further shows that the shell 11 is formed with at least one, preferably two, side portions 11A that provide some privacy relative to neighboring support structures 7 in a row and relative to an aisle. The side portions 11A face in the direction opposite to the flight or forward direction FWD.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A passenger aircraft comprising a passenger cabin structure, a standing room area (5) in said passenger cabin structure, at least one passenger stand (3) mounted to said cabin structure in said standing room area (5) having a standing clearance accommodating said at least one passenger stand in which a passenger retains an upright standing position during starting, during flight and during landing of said passenger aircraft in the gravity field of the earth, said passenger stand (3) comprising a passenger upright backing (6,6',11) for taking up accelerations to which an upright standing passenger in said passenger stand is exposed during said starting, flight, and landing of said passenger aircraft in said gravity field, and a safety device (14) secured to said passenger stand (3) for holding an upright standing passenger in said passenger stand in an upright passenger position during said starting, flight, and landing of said passenger aircraft in said gravity field, whereby a gravity gradient is effectively substantially extending from head to toe of a passenger.

2. The passenger aircraft of claim 1, further comprising a seating area (4) in said passenger cabin structure outside said standing room area (5), and passenger seats (PS) mounted to said cabin structure in said seating area (4).

3. The passenger aircraft of claim 2, wherein said seating area has a seating clearance between floor and ceiling less than said standing clearance in said standing room area (5).

4. The passenger aircraft of claim 1, comprising a plurality of passenger stands arranged in rows and columns in said standing room area.

5. The passenger aircraft of claim 1, wherein said passenger backing of said at least one passenger stand comprises a horizontal axis, extending perpendicularly to a flight direction of said cabin structure, and wherein said safety device (14) is so arranged relative to said backing that an upright standing passenger using said passenger stand and held in place by said safety device faces opposite said flight direction during starting, flight, and landing.

6. The passenger aircraft of claim 1, wherein said passenger backing is formed as any one of a vertical support, a vertical rest, and a vertical backing wall, and wherein said passenger backing is oriented substantially perpendicularly to a flight direction for supporting a standee's back in an upright standing position.

7. The passenger aircraft of claim 1, wherein said passenger stand comprises posts (10, 10') rigidly secured to said cabin structure, wherein said passenger backing comprises a supporting wall formed as a backing shell (11) secured to said posts (10, 10'), and wherein said safety device comprises a safety belt (14) secured to said passenger stand.

8. The passenger aircraft of claim 7, wherein said safety belt is a three-point safety belt secured at three connecting points to said passenger stands.

9. The passenger aircraft of claim 8, further comprising an adjustment mechanism (A2) for adjusting a position of at least one of said three connecting points to accommodate passengers of different sizes.

10. The passenger aircraft of claim 1, further comprising an auxiliary seat (16) as part of said upright passenger stand.

11. The passenger aircraft of claim 1, wherein said passenger backing comprises a shell (11) or flat wall (6') secured to said cabin structure, said shell or flat wall having at least one back portion forming said passenger backing and at least one side portion (11A) for providing privacy for a person standing in an upright position in said passenger stand.

12. The passenger aircraft of claim 11, wherein said shell comprises two side portions extending away from said at least one back portion in a direction opposite a flight direction.

13. The passenger aircraft of claim 1, further comprising at least one upright or vertical post (VP) secured to said cabin structure, and wherein said passenger backing is secured to said at least one upright post for angularly adjusting said passenger backing into several different upright use positions relative to a forward flight direction.

14. The passenger aircraft of claim 13, wherein said at least one upright post is rotatably secured to said cabin a structure, wherein said shell is rigidly secured to said at least one upright post, and further comprising a locking mechanism (L, H) for locking said shell in any one of said upright use positions at an angle relative to said forward flight direction.

15. The passenger aircraft of claim 13, wherein said at least one upright post is rigidly secured to said cabin structure, wherein said shell is rotatably secured to said at least one upright post, and further comprising a locking mechanism (L, H) for locking said shell in any one of several upright use positions at an angle relative to a flight direction.

16. A stand for transporting a passenger in an upright standing position in an aircraft cabin of a passenger aircraft, said stand (3) comprising a passenger backing (6, 6', 11) for taking up accelerations to which an upright standing passenger in said stand is exposed during starting, during flight, and during landing has been added, at least one post secured to said passenger backing, means for mounting said at least one post in said aircraft cabin in an upright position between a cabin floor and a cabin ceiling, and a safety device (14) secured to said stand for holding an upright standing passenger upright in said stand during said starting, during flight, and during landing of said passenger aircraft in the gravity field of the earth, whereby a gravity gradient is effectively substantially extenting from head to toe of a passenger.

17. The stand of claim 16, wherein said safety device is a three-point belt.

18. The stand of claim 16, further comprising an auxiliary seat (16) secured to said stand.

19. The stand of claim 18, further comprising a vertical adjustment mechanism (A1) for adjusting a vertical elevation of said auxiliary seat (16) for accommodating passengers of different sizes.

20. A method for transporting passengers in an upright standing position in a passenger aircraft, said method comprising the following steps:

(a) providing an aircraft cabin of said passenger aircraft with at least one upright passenger stand;

(b) selling at least one standing room only ticket; and (c) securing a passenger having a standing room only ticket in said at least one upright passenger stand so that said passenger retains an upright standing position during starting, during flight, and during landing of said pasenger aircraft in the earth atmosphere, whereby a gravity gradient is effectively substantially extending from head to toe of a passenger.

21. The method of claim 20, further comprising selling time shared tickets for a passenger seat and a passenger stand for two persons to alternately share a passenger seat and a passenger stand.

* * * * *

UNITED STATES PATENT AND TRADEMARK OFFICE
CERTIFICATE OF CORRECTION

PATENT NO. : 6,467,728 B2
DATED : October 22, 2002
INVENTOR(S) : Angerami et al.

It is certified that error appears in the above-identified patent and that said Letters Patent is hereby corrected as shown below:

Column 4,
Line 24, after "conventional passenger", insert -- seats PS. A second standing room area 5 holds passenger stands 3. --.

Column 5,
Line 67, after "structures", insert -- 7 --.

Column 7,
Line 22, after "cabin", delete "a".

Column 8,
Line 1, after "landing", delete "has been added" and insert -- of said passenger aircraft in the gravity field of the earth --.

Signed and Sealed this

Twenty-fifth Day of February, 2003

JAMES E. ROGAN
*Director of the United States Patent and Trademark Office*